UNITED STATES PATENT OFFICE.

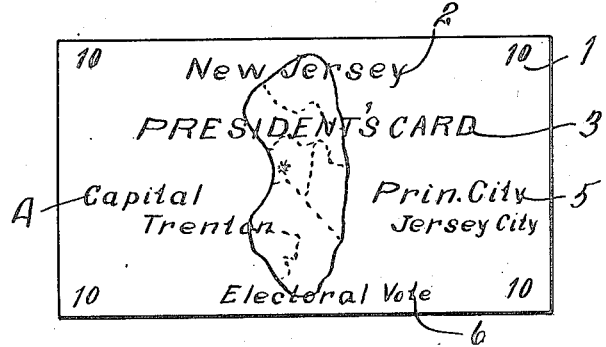
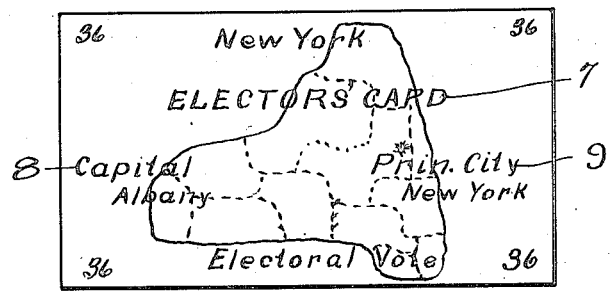
 

SIEGMUND JAFFA, OF NEW YORK, N. Y.

GAME DEVICE.

1,115,434. Specification of Letters Patent. Patented Oct. 27, 1914.

Application filed July 29, 1914. Serial No. 853,938.

*To all whom it may concern:*

Be it known that I, SIEGMUND JAFFA, a subject of the Emperor of Germany, residing at New York, in the county of New York and State of New York, have invented certain new and useful Improvements in Game Devices; and I do hereby declare the following to be a full, clear, and exact description of the invention, such as will enable others skilled in the art to which it appertains to make and use the same.

This invention relates to game devices, and one of the principal objects of the same is to provide a game of chance which shall be based upon the election of a President of the United States, and which will be interesting, instructive, and amusing.

In carrying out the invention, a number of cards are utilized and a number of blocks or men, the cards representing each State and showing thereon the name and map of the State, the capital city, the principal cities, and the number of electoral votes for said State, while the blocks are each provided with the name of one State.

Referring to the drawing: Figure 1 represents the President's card, and since the President is from New Jersey, this card will be called the President's card or the New Jersey card and will have displayed thereon an outlined map of the State of New Jersey, Fig. 2 is a face view of one of the cards used in the game, this card being shown as the New York card or electors' card of New York, Fig. 3 is a face view of one of the accessories to the game comprising a checker or block, each representing a State, the one shown in Fig. 3 representing Iowa, and Fig. 4 is an edge view of said checker or block.

Referring to the drawing, the numeral 1 designates the President's card, and displayed on said card is the name of the State from which the President was elected, represented by the numeral 2. The words President's card appears on the face of the card and are indicated by the numeral 3. The capital city of the State is indicated at 4, the principal city at 5, and the number of electoral votes of the State by the numeral 6. The other cards of the game each consist of a card having displayed thereon the map of some one State together with the words "Electors' card" indicated at 7, the capital city indicated at 8, the principal city indicated at 9, and the electoral vote indicated at 10. The men or checkers 11 each contain the name of one State 12.

From the foregoing it will be understood that there are forty-eight cards, each card representing a State, and giving the number of electoral votes thereon, one of said cards being represented as the President's card and giving the State of the Union from which the President was elected, and the accessories to the game are the checkers or blocks each having thereon the name of one State, forty-six blocks in all.

In playing the game the cards are dealt around to each player, one at a time, and if there are four players, there will be eight cards held out, which are placed in the center of the table as a "crib" or "kittie". After dealing, it will be found that each player has ten cards and there are eight cards in the "crib". The person who holds the President's card will then shake up the checkers or men in a hat and draw one therefrom by chance. He then calls out the name of the State which he has drawn from the hat, and the player holding this card turns the card face down. The player who has had the names of the States represented by his cards called out by the President, is the winner of the game, provided the number of electoral votes represented by the States are sufficient to provide a majority of the votes. After the cards of one player have been turned face down, the President says, "The election is over, let us count the votes." The cards which have not been turned over are thrown into the center of the table as discards. The official counter or President asks each player in succession, how many votes he has, and writes them on a piece of paper. The player with the most votes is elected President, and the new President deals the cards for the next election.

The game may be made very interesting and instructive, and should be amusing for both old and young.

What is claimed is:—

1. A game device comprising a pack of cards, each card representing the name of a State and the electoral vote of said State, together with other information, and one of said cards being designated as the President's card, and giving the State from which the President was elected, and as accessories to the game a number of checkers or blocks, each representing a State.

2. A game device consisting of a series of cards, each card representing a State and having displayed thereon a map of the State, the words "Electors' card", the capital city of the State, the principal city of the State, and the number of electoral votes of said State, and a President's card giving the name of the State from which the President was elected, a map of the State, the capital of the State, and other information in relation to the State, and the number of electoral votes thereon, and a series of checkers or blocks each having displayed thereon the name of a State.

In testimony whereof I affix my signature in presence of two witnesses.

SIEGMUND JAFFA.

Witnesses:
    FANNIE BECKER,
    MARVIN RICE.